Feb. 6, 1962  E. A. ARNOLD ET AL  3,019,715
UNDERWATER CASING, INCLUDING CAMERA CONTROL MEANS
Filed June 30, 1959  3 Sheets-Sheet 1

INVENTOR.
ERNEST A. ARNOLD
ALBERT W. PIPES
BY
William Frederick Werner
ATTORNEY

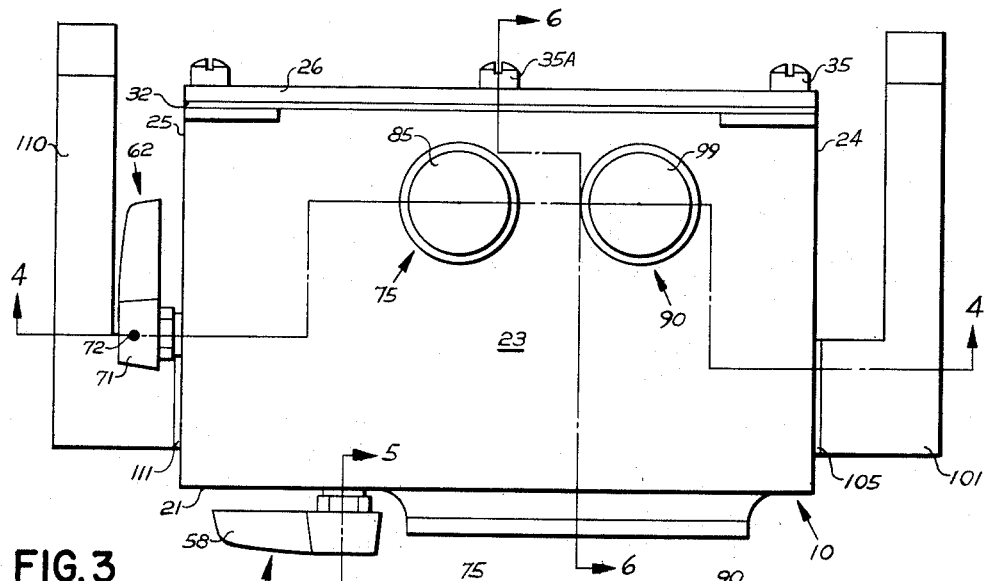
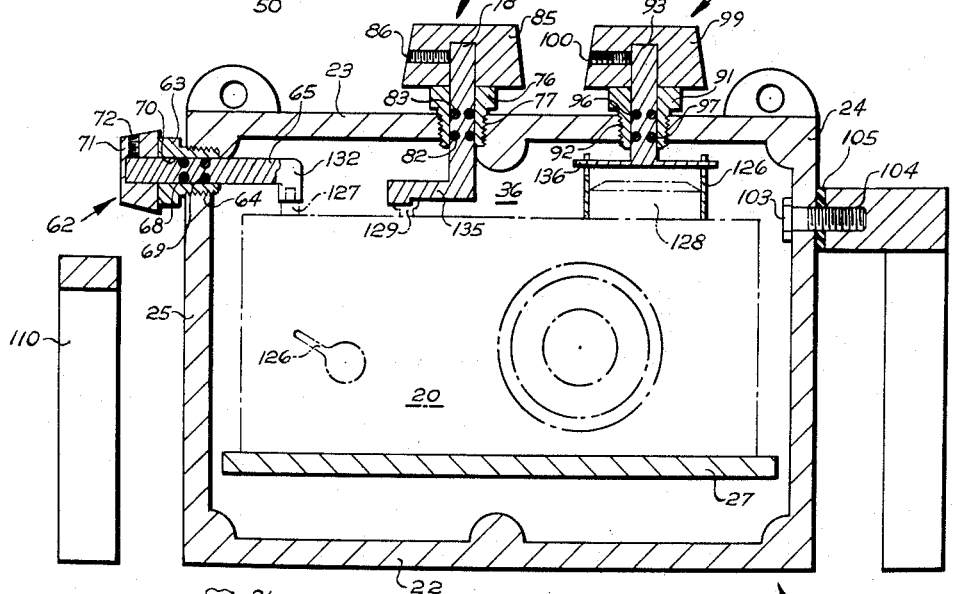
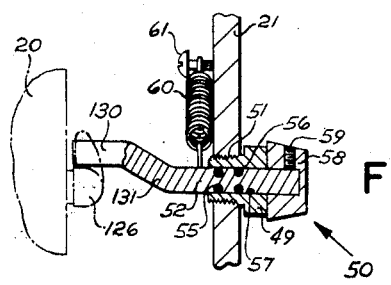

Feb. 6, 1962    E. A. ARNOLD ET AL    3,019,715
UNDERWATER CASING, INCLUDING CAMERA CONTROL MEANS
Filed June 30, 1959    3 Sheets-Sheet 3
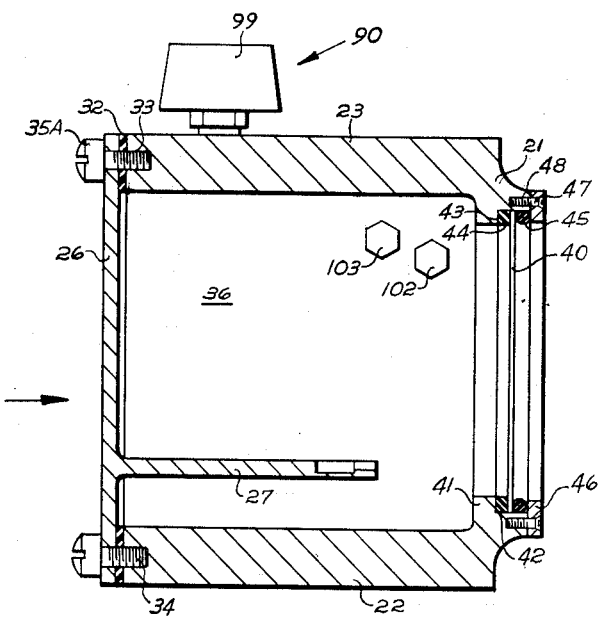
FIG. 6
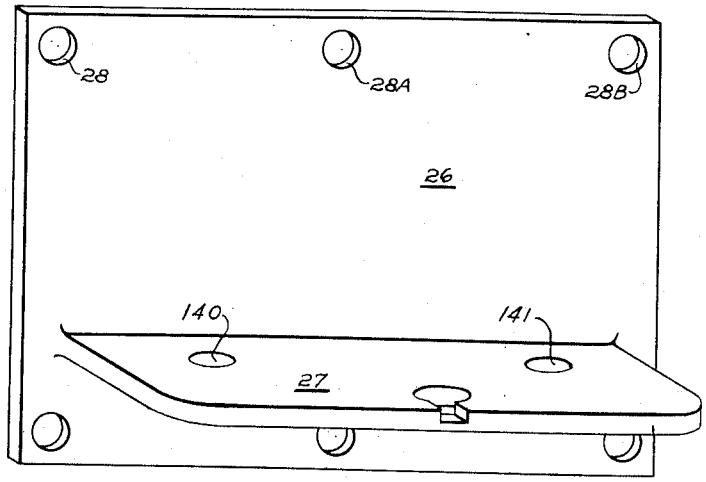
FIG. 7
FIG. 8
INVENTOR.
ERNEST A. ARNOLD
ALBERT W. PIPES
BY
William Frederick Werner
ATTORNEY

United States Patent Office 3,019,715
Patented Feb. 6, 1962

3,019,715
UNDERWATER CASING, INCLUDING CAMERA CONTROL MEANS
Ernest A. Arnold, 91 Lee St., and Albert W. Pipes, 361 Vine St., both of Pawtucket, R.I.
Filed June 30, 1959, Ser. No. 824,002
1 Claim. (Cl. 95—11)

The present invention relates to improvements in underwater camera casings and has for its general object to provide a fluid-tight case which is of such a design and construction that any type camera can be carried in the body thereof enabling the camera to be submersible in water and portably carried thereunder for the purpose of taking photographs of marine life, aqueous vegetation and under-water sport activities. Other uses include photographing under hazardous weather conditions, such as hurricanes and severe dust storms, for use in the field of scientific photography where poisonous gases or other aeriform fluids are present which may prove harmful to the photographic film upon their invasion into the camera, the embodiment rendering a more protective and efficient means for taking pictures where ordinary cameras operating under the aforementioned adverse conditions would prove inoperative and unreliable.

Another object of the invention is to provide an improved under-water camera in which a camera, either still or of the motion picture type, is mounted in a liquid and gas-tight manner within an external case, preferably of a material resistant to the corrosive action of water, poinsonous gases, etc., and wherein the normal and usual controls of the camera are brought in a watertight manner through the case to the exterior thereof in such manner that the internally protected camera is operable from the outside of the protective case and through which the photographing of pictures by the internally sealed camera may be accomplished.

With the foregoing and other objects in view, the invention will be more fully described hereinafter and more particularly pointed out in the appended claims.

In the drawings, in which like parts are denoted by the same reference characters throughout the several views, FIGURE 1 is a perspective view of the new and improved underwater camera casing including camera control means.

FIGURE 3 is a plan view of FIGURE 1.

FIGURE 4 is a transverse cross sectional view taken along line 4—4 of FIGURE 3 and diagrammatically illustrating a camera positioned within the casing.

FIGURE 5 is a fragmentary cross sectional view taken along line 5—5 of FIGURE 3 and diagrammatically illustrating a camera control lever.

FIGURE 6 is a vertical cross sectional view taken along line 6—6 of FIGURE 3.

FIGURE 7 is a perspective view of the back plate and platform.

FIGURE 8 is a perspective view of an adapter which may be used with the camera control means.

Figure 1:
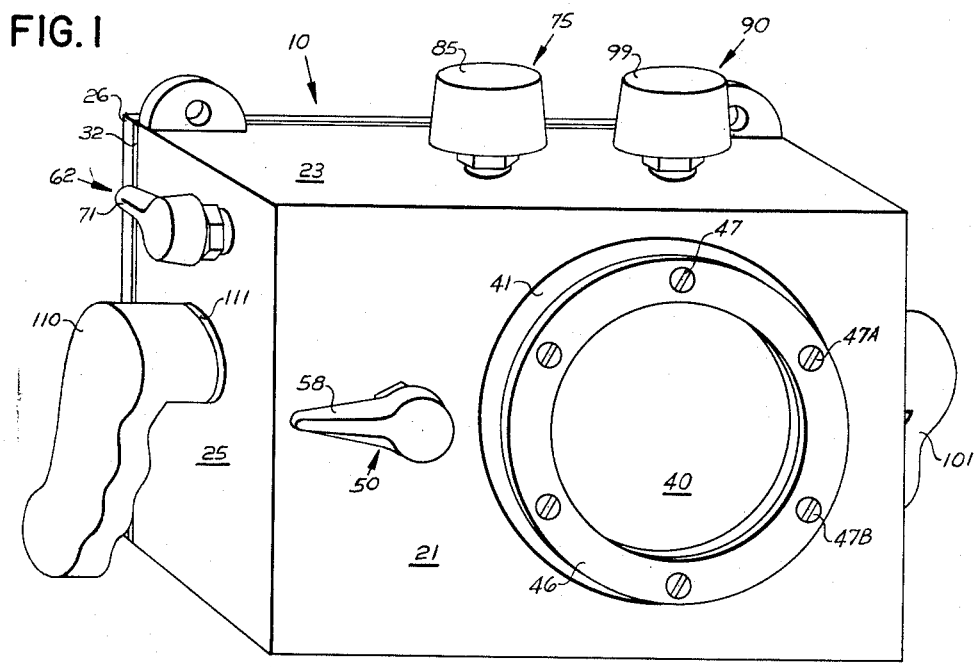
Figure 2:
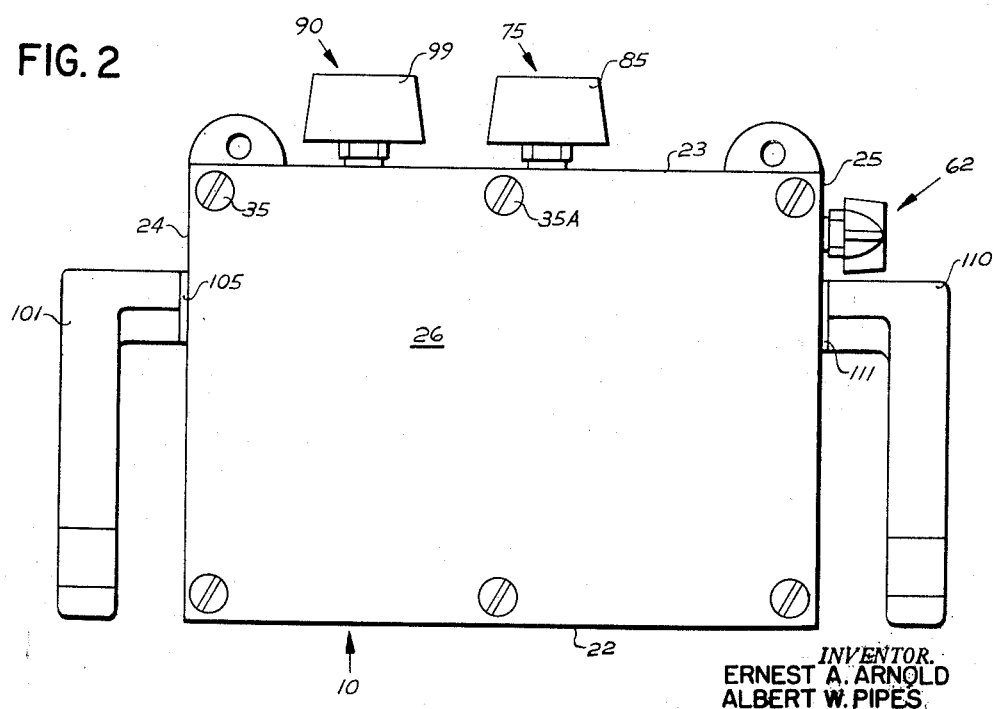
FIGURE 2 is a rear elevational view of FIGURE 1.

Referring more particularly to the drawings, one form of liquid and gas-tight case is shown in connection with a particular type of camera 20, which in this instance is an Argus C3 still camera having a usual form of film wind, spring loaded shutter release, safety lock film aligner, all of which parts are well known in the art and which will be hereinafter more particularly referred to in connection with the improvements in the liquid and gas-tight case in which the camera 20 is adapted to be housed.

The case generally indicated by reference character 10, is fabricated preferably of metal and advantageously of stainless steel, brass, aluminum, or plastics, which will resist the corrosive action of water and poisonous or other gases, comprises a front wall 21, a bottom wall 22, a top wall 23, a right side wall 24, a left side wall 25 and a rear wall 26; removably secured to top wall 23 and bottom wall 22 for the introduction and removal of the camera 20.

Rear wall 26 is provided with a camera supporting shelf 27 integrally cast or formed in said rear wall and a plurality of bolt receiving orifices 28, 28A, 28B, etc. A gasket 32 of rubber or other suitable material is interposed between rear wall 26 and the end surfaces of bottom wall 22, top wall 23, right side wall 24 and left side wall 25 in order to make a liquid and gas-tight seal between rear wall 26 and the end surfaces. Tapped holes are provided in top wall 23 and bottom wall 22 as illustrated in FIGURE 6 at 33 and 34. However, it is to be understood that the tapped holes could be provided in left side wall 25 or right side wall 26 just as readily. A series of bolts 35, 35A secure rear wall 26 to top wall 23 and bottom wall 22 to complete the fluid tight sealing of the chamber 36 formed by the walls.

Front wall 21 is provided with a photographing window 40. As shown in FIGURE 6, this window comprises a ring frame 41 integrally formed in front wall 21. Ring frame 41 is provided with a step 42 and a flange 43. Two gaskets 44, 45 of rubber or other suitable material, are placed on opposite sides of window 40 with gasket 44 abutting flange 43 and with said windows and gaskets positioned over step 42. A ring plate 46 provided with a plurality of screw receiving orifices is secured to ring frame 41 by means of screws 47, 47A, 47B, etc., which engage tapped holes 48 in ring frame 41. Ring plate 46 forces gaskets 44, 45 into fluid-tight and gas-tight sealing engagement with window 40, step 42 and flange 43.

Front wall 21, bottom wall 22, top wall 23, right side wall 24 and left side wall 25 are preferably fabricated as a casting or molding having a core to provide ring frame 41 and a chamber 36 open on the rear side. It becomes apparent that case 10 is inexpensive to manufacture. Its walls are waterproof. Any openings made in the casing to provide for the controls must be made waterproof. Four controls pass through the casing 10. Each control is predicated upon a one quarter inch stainless steel pipe plug. The front control is a spring loaded shutter setting lever. The left side control is a shutter release lever. The top left knob is provided to release the safety lock. The upper right knob is provided to advance the film from frame to frame.

Referring to FIGURES 1, 3 and particularly FIGURE 5, the front control or spring loaded camera shutter setting lever, generally indicated by reference character 50, consists of pipe plug 49 fixed in front wall 21 by means of threads 51. A shaft 52 is provided with two circular recesses. "Neoprene," O rings 55, 56 are located in circular recess. O rings 55, 56 engaging passageway 57 in pipe plug 50 form a fluid tight seal. A lever 58 is secured to shaft 52 by means of a set screw 59. A coil spring 60 is secured on one end to shaft 52 and on the other end to front wall 21 by means of a screw 61 fixed in front wall 21. Coil spring 60, yieldingly holds lever 58 in a predetermined position.

Similarly, a shutter release lever, generally indicated by reference character 62, consists of a pipe plug 63 fixed in left side wall 25 by means of threads 64. A shaft 65 is provided with two circular recesses. "Neoprene," O rings 68, 69 are located in the circular recesses. O rings 68, 69 engaging passageway 70 in pipe plug 62 form a fluid tight seal. A lever 71 is secured to shaft 65 by means of a set screw 72.

A safety lock release, generally indicated by reference numeral 75, consists of a pipe plug 76, fixed in top wall 23 by means of threads 77. A shaft 78 is provided with two circular recesses. "Neoprene," O rings 82, 83 are located in the circular recesses. O rings 82, 83 engaging the passageway in the pipe plug 76 form a fluid tight seal. A knob 85 is secured to shaft 78 by means of a set screw 86.

A film advance knob, generally indicated by reference numeral 90, consists of a pipe plug 91, fixed in top wall 23 by means of threads 92. A shaft 93 is provided with two circular recesses. "Neoprene," O rings 96, 97 are located in the circular recesses. O rings 96, 97 engaging the passageway in pipe plug 91 form a fluid tight seal. A knob 99 is secured to shaft 93 by means of a set screw 100.

A handle 101 is secured to right side wall 24 by means of two screws 102, 103 which pass through clearance orifices in side wall 24 and mate with threads 104 in handle 101 (see FIGURE 4). A gasket 105 is interposed between handle 101 and side wall 24 to form a fluid tight connection. In like manner, a handle 110 is secured to left side wall 25 with a gasket 111 interposed between handle 110 and left side wall 25.

Referring to FIGURE 8 wherein is illustrated an adapter, generally indicated by reference character 125. Adapter 125 consists of a circular collar 126 provided with four slots 127, 128, 129 and 130 located ninety degrees from the next adjacent slot. A set screw 131 is rotatively mounted in circular collar 126.

The Argus C3 camera is provided with a cocking lever 126A, a shutter release button 127A, a film transport wheel 128A, and a film transport lock 129A.

Spring loaded camera shutter setting lever 50, through shaft 52 which is offset at 130 through section 131, engages cocking lever 126A so that depression of lever 58 against the tension of spring 60 actuates cocking lever 126A to actuate the camera 20 mechanism thereby spring loading the camera shutter prior to taking a picture.

Depression of shutter release lever 62 through the bent stem 132 of shaft 65 releases shutter button 127A and thereby the spring loaded camera shutter, to snap the picture.

Adapter 125 is secured to film transport wheel 128A by means of set screw 131. Shaft 93 is provided with a flange 136 which engages slots 127, 129 or slots 128, 130. Rotation of knob 85, through the bent section 135 of shaft 78 releases the film transport lock 129A so that rotation of knob 99 through flange 136, and adapter 125, rotates film transport wheel 128A to advance the film from frame to frame. As the next adjacent frame arrives in position in front of the camera lens the film transport lock 129A automatically locks the film in position until it is released by rotation of knob 85.

The camera 20 is mounted upon platform 27 and is secured thereto by means of screws (not shown) which pass through orifices 140, 141 into tapped holes located in the camera for that purpose or for use of a tripod when the camera is used in the ordinary way. The camera lens is automatically aligned with port 40 through the location of platform 27.

It becomes obvious that pipe plug controls such as 50, 62, 75 and 90 may be located anywhere on camera case 10 and that their number may be increased or decreased to accommodate cameras other than an Argus C3.

Having shown and described a preferred embodiment of the present invention, by way of example, it should be realized that structural changes could be made and other examples given without departing from either the spirit or scope of this invention.

What we claim is:

An underwater camera casing including camera control means comprising a five sided casing having a bottom wall, top wall, left side wall, right side wall and a front wall forming an open rear wall chamber, said front wall having an opening consisting of a ring frame provided with a step and a flange, a photographing window formed in said opening comprising a gasket engaging said flange and said step, a window of transparent material engaging said gasket and said step, a second gasket engaging said step and said window and a ring plate engaging said second gasket, screw means to secure said ring plate to said ring frame to form a fluid tight seal around said window, a rear wall provided with a platform, a rear wall gasket located between said rear wall and the top, bottom, right side and left side walls, screw means to secure said rear wall to said top, bottom, right side and left side wall whereby said rear wall forms a fluid tight chamber in cooperation with said five sided casing and fluid tight window, said platform projecting into said chamber, a left side handle, a handle gasket, screw means securing said left side handle and gasket to said left side wall in fluid tight relationship, a right side handle, a second handle gasket, screw means securing said right side handle and gasket to said right side wall in fluid tight relationship, a plurality of camera control means comprising a spring loaded camera shutter setting lever, consisting of a pipe plug fixed in said front wall in fluid tight relationship by means of pipe threads, a shaft provided with a circular recess, an O ring located in said last mentioned circular recess, said shaft and O ring rotatively mounted in said pipe plug, a lever fixed to one end of said shaft on the outside of said front wall, the other end of said shaft projecting into said chamber and adapted to engage the cocking lever of a camera, and a coil spring fixed on one end to said shaft and on the other end to the front wall to yieldingly hold said shaft in pre-selected position, a shutter release lever consisting of a pipe plug fixed in said left side wall in fluid tight relationship by means of pipe threads, a second shaft provided with a circular recess, an O ring located in said circular recess, said second shaft and O ring rotatively mounted in said pipe plug, a lever fixed to one end of said shaft on the outside of said left side wall, the other end of said second shaft projecting into said chamber and adapted to engage the shutter release button of a camera, a safety lock release, consisting of a pipe plug fixed in the top wall in fluid tight relationship by means of pipe threads, a third shaft provided with a circular recess, an O ring located in said last mentioned circular recess, said third shaft and O ring rotatively mounted in said last mentioned pipe plug, a knob fixed to one end of said third shaft on the outside of said top wall, the other end of said shaft projecting into said chamber and adapted to engage the film transport lock of a camera, and a film advance knob, consisting of a pipe plug fixed in said top wall in fluid tight relationship by means of pipe threads, a fourth shaft provided with a circular recess, an O ring located in said last mentioned circular recess, said fourth shaft and O ring rotatively mounted in said last mentioned pipe plug, a knob fixed to one end of said fourth shaft on the outside of said top wall, the other end of said shaft projecting into said chamber, an adapter consisting of a circular collar provided with a plurality of slots, means on said fourth shaft to engage said plurality of slots to rotate said adapter, means to secure said adapter to the film transport wheel of a camera located in said chamber and fixed to said platform whereby said platform orients said camera with the photographing window and the plurality of camera control means.

References Cited in the file of this patent

UNITED STATES PATENTS

| | | |
|---|---|---|
| 1,122,104 | Gruen | Dec. 22, 1914 |
| 2,487,868 | Grigsby | Nov. 15, 1949 |
| 2,573,885 | Whitman | Nov. 6, 1951 |
| 2,883,919 | Jayet | Apr. 28, 1959 |

FOREIGN PATENTS

| | | |
|---|---|---|
| 433,686 | Italy | Apr. 13, 1948 |